US011982414B2

(12) United States Patent
Xue et al.

(10) Patent No.: US 11,982,414 B2
(45) Date of Patent: May 14, 2024

(54) STRIP LIGHT AND STRIP LIGHT SET

(71) Applicants: Self Electronics Co., Ltd., Zhejiang (CN); Wanjiong Lin, Zhejiang (CN); Self Electronics USA Corporation, Norcross, GA (US)

(72) Inventors: Yuanfang Xue, Zhejiang (CN); Zhaoyong Zheng, Zhejiang (CN); Huangfeng Pan, Zhejiang (CN)

(73) Assignee: Sell Electronics Co., Ltd., Ningbo (CN)

( * ) Notice: Subject to any disclaimer, the term of this patent is extended or adjusted under 35 U.S.C. 154(b) by 0 days.

(21) Appl. No.: 18/326,512

(22) Filed: May 31, 2023

(65) Prior Publication Data

US 2023/0392761 A1 Dec. 7, 2023

(30) Foreign Application Priority Data

Jun. 2, 2022 (CN) ......................... 202210623373.9

(51) Int. Cl.

| | |
|---|---|
| ***F21S 4/28*** | (2016.01) |
| ***F21V 5/04*** | (2006.01) |
| ***F21V 21/002*** | (2006.01) |
| ***F21V 23/06*** | (2006.01) |
| *F21V 5/08* | (2006.01) |
| *F21Y 103/20* | (2016.01) |
| *F21Y 115/10* | (2016.01) |

(52) U.S. Cl.

CPC ................ *F21S 4/28* (2016.01); *F21V 5/043* (2013.01); *F21V 21/002* (2013.01); *F21V 23/06* (2013.01); *F21V 5/08* (2013.01); *F21Y 2103/20* (2016.08); *F21Y 2115/10* (2016.08)

(58) Field of Classification Search

CPC .......... F21S 4/28; F21V 5/043; F21V 21/002; F21V 23/06

See application file for complete search history.

(56) References Cited

U.S. PATENT DOCUMENTS

2013/0343050 A1* 12/2013 Hu ............................ F21S 4/28 362/217.14
2017/0184284 A1* 6/2017 Van Winkle ............ F21S 8/061
2019/0003656 A1* 1/2019 Powell ...................... F21S 2/00
2021/0080088 A1* 3/2021 Chen ...................... F21V 21/005
2023/0097841 A1* 3/2023 Du .......................... F21S 2/005 362/249.01
2023/0160548 A1* 5/2023 Hu ........................ F21V 15/015 362/458

* cited by examiner

*Primary Examiner* — Christopher E Dunay

(74) *Attorney, Agent, or Firm* — Wang Law Firm, Inc.

(57) ABSTRACT

A strip light has a lamp holder, a light source module, an optical assembly, and two end cover assemblies. The first end cover assembly has an outer cover fixedly connected with the end of the strip-shaped lamp holder and a male socket electrically connected with the light source module, the second end cover assembly has an outer cover fixedly connected with the end of the strip-shaped lamp holder and a female socket electrically connected with the light source module, and the male socket is provided with at least two contact pins. The outer cover is provided with a jack for accommodating the contact pin, a separation part for separating the contact pin is arranged in the jack, the tail end of the contact pin is positioned on the inner side of the tail end of the separation part, and a safe distance is formed between the two tail ends.

9 Claims, 11 Drawing Sheets

STRIP LIGHT AND STRIP LIGHT SET

RELATED APPLICATION

This application claims priority to a Chinese Patent Application No. CN202210623373.9, filed on Jun. 2, 2022.

FIELD OF THE TECHNOLOGY

The present invention relates to lighting equipment, especially a strip light and strip light set which is applied in high-voltage put in.

BACKGROUND

In the context of energy saving and environmental protection, LED lamps are increasingly used in home and commercial lighting fields because of their high light-emitting efficiency and good light-gathering performance. Because it emits light from a point light source, the utilization rate of light can be improved by means of secondary light distribution. In the application of high-voltage strip lights, in order to facilitate interconnection, it is generally set that both ends can be powered. For safety considerations, the requirement for such lights is that both ends cannot be male or female, that is, it is said that only one end can be connected to the mains. When the position of the mains changes, the connection can be realized as long as the direction of the lamp head is changed, but this requires the light distribution of the strip itself to be symmetrical, that is, it will not affect the light output after the switch, but in fact, one of the advantages of LED lamps is that they can perform secondary light distribution to achieve the ideal light output effect. In many cases, the light output is not symmetrical. At this time, it cannot be turned around and used. There is a contradiction between installation convenience and lighting efficiency.

BRIEF SUMMARY OF THE TECHNOLOGY

In view of this, the present invention provides a high-pressure strip light and high-pressure strip light set to solve the above technical problems.

A strip light includes a strip lamp holder, a light source module arranged on the strip lamp holder, an optical assembly arranged on the light source module in the direction of the light source module, and a first end cap assembly and a second end cap assembly arranged on both ends, the first end cap assembly comprising a first outer cover fixed with the end of a strip lamp holder and a male socket electrically connected with a light source module, the male socket is provided with at least two pins, and the first outer cover is provided with a first socket for accommodating the pin, the first insertion hole is provided with a partition that separates the pins, the ends of the pins are located inside the ends of the partitions and a safe distance is provided between them.

TECHNICAL EFFECTS OF THE PRESENT INVENTION

The high-voltage strip lamp of the present invention meets the requirement of safety regulations that the same lamp cannot have the same male and the same female, and at the same time realizes the function of feeding electricity at both ends. The side-scanning asymmetric lamps have better irradiation effect and meet the needs of diversified customers. At the same time, the setting of the safety distance meets the requirements of the test finger in the safety regulations, there is no risk of electric shock, and it is more convenient to adapt to various room electrical wiring, without considering the arrangement of lamps.

BRIEF DESCRIPTION OF THE DRAWINGS

The following describes embodiments of the present invention in conjunction with the accompanying drawings, wherein.

DETAILED DESCRIPTION OF THE INVENTION

Figure 1:
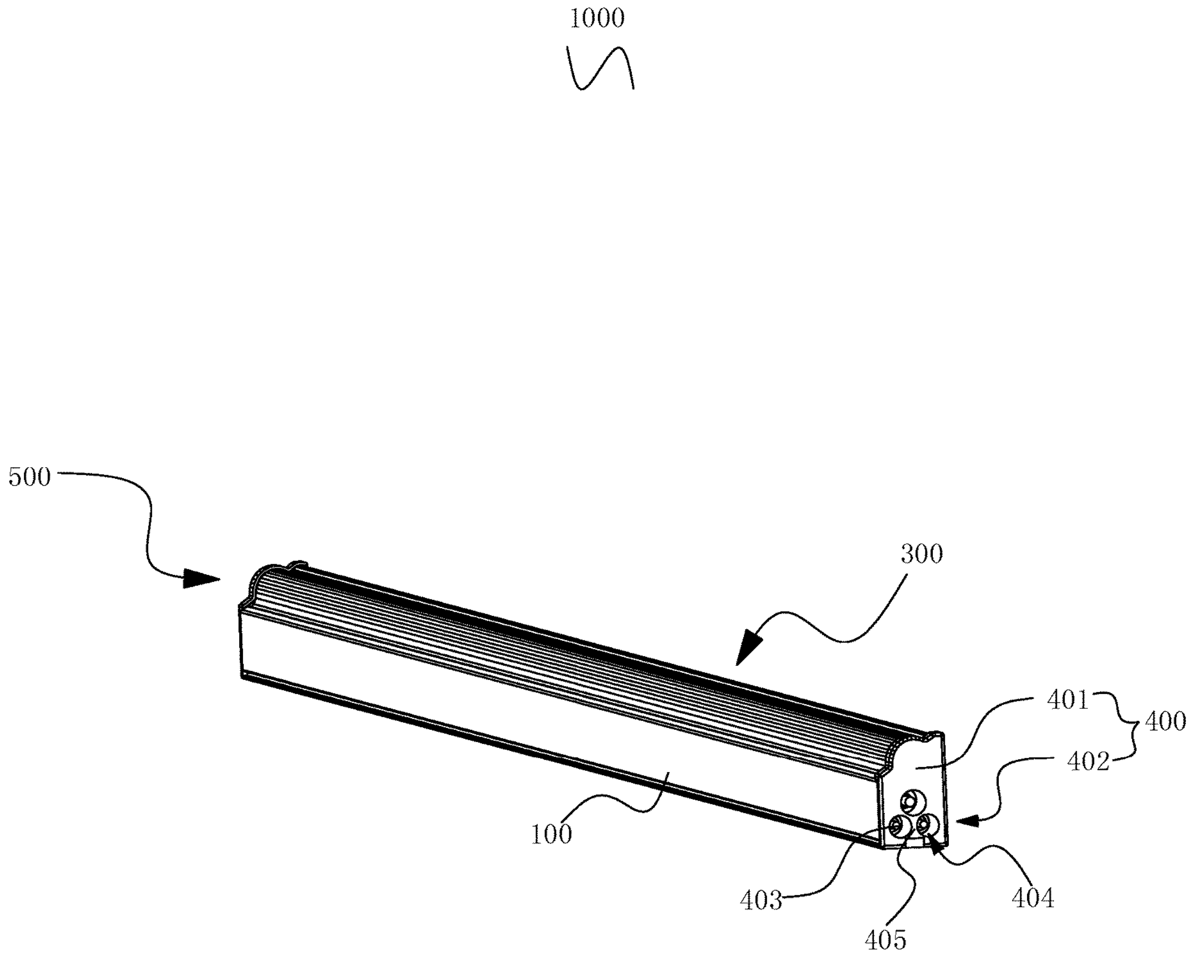
FIG. 1 is a schematic diagram of the structure of the strip light of a embodiment.
Figure 2:
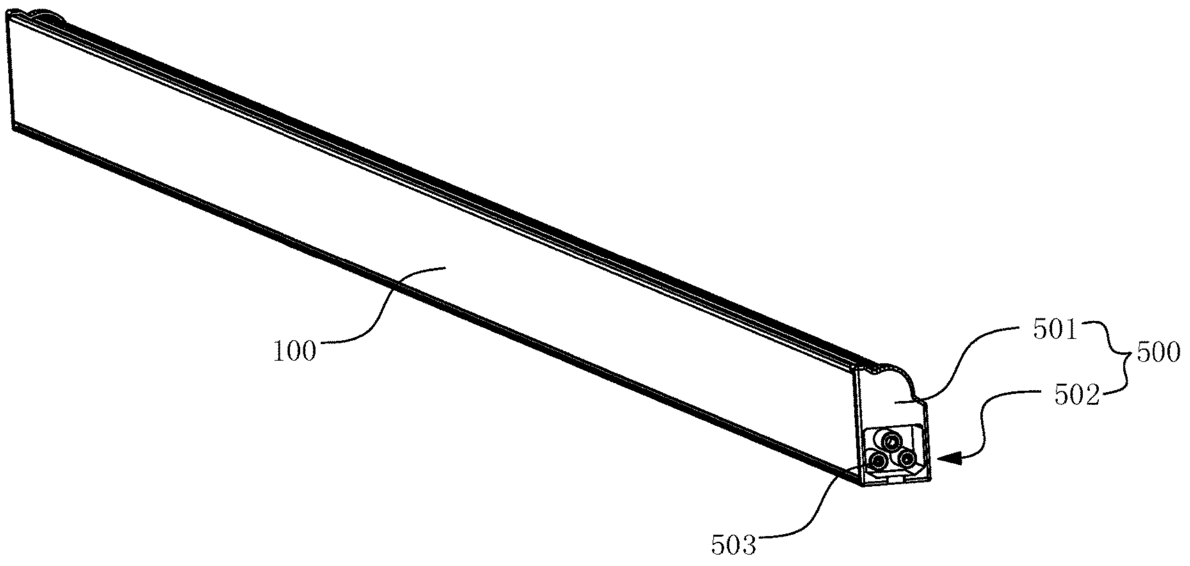
FIG. 2 is a schematic diagram of the structure of the strip light of this embodiment at another angle.
Figure 3:
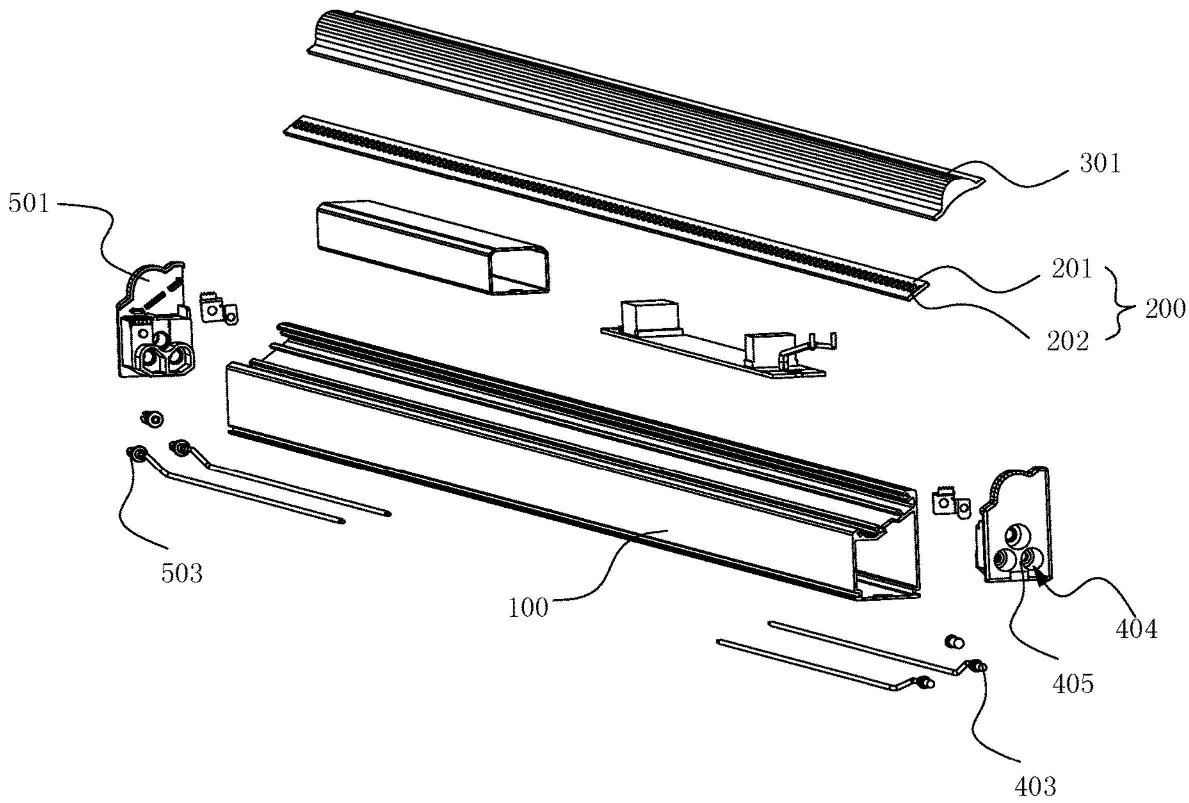
FIG. 3 is a schematic diagram of the exploded structure of the strip light of this embodiment.
Figure 4:
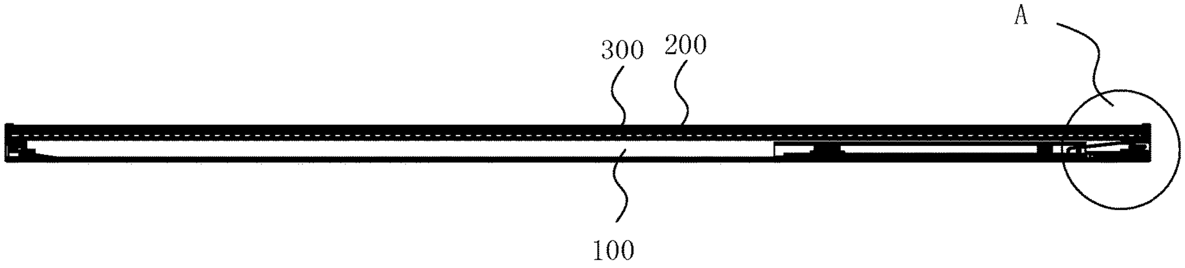
FIG. 4 is a schematic diagram of the strip light of this embodiment in a cross-sectional view.
Figure 5:
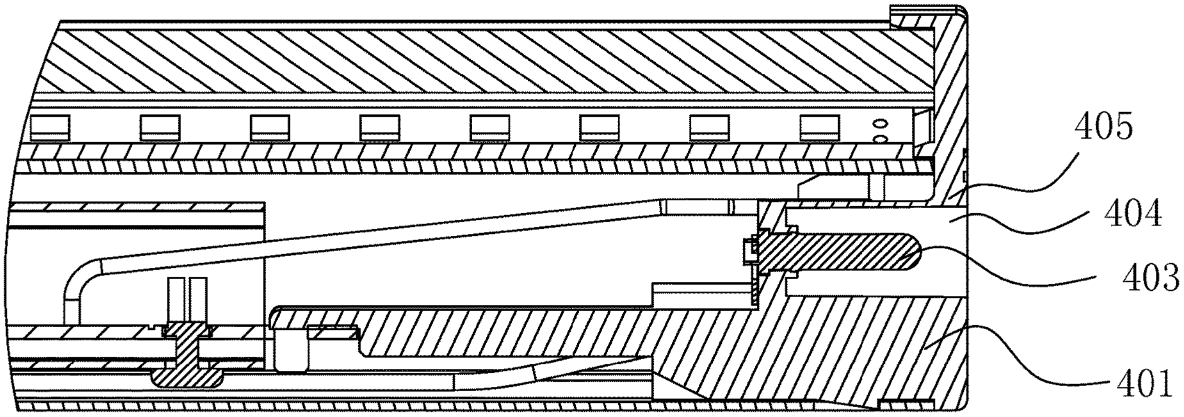
FIG. 5 is an enlarged schematic diagram of part A in FIG. 4.

The following specific embodiments of the present invention will be described in further detail based on the accompanying drawings. It should be understood that the description of the embodiments of the present invention here is not intended to limit the protection scope of the present invention.

As shown in FIGS. 1 to 5, the strip light 1000 of this embodiment includes a strip light frame 100, a light source module 200 disposed on the strip light frame 100, an optical component 300 disposed in the light emitting direction of the light source module 200, and first end cover assembly 400 and second end cover assembly 500 are disposed on two sides of the light source module 200. The first end cover assembly 400 includes a first outer cover 401 fixedly connected with the end of the strip light frame 100 and a male socket 402 electrically connected with the light source module 200, the second end cover assembly 500 includes a second outer cover 501 that is fixedly connected to the end of the strip light stand 100 and a female socket 502 that is electrically connected to the light source module 200. The male socket 402 is provided with at least two pins 403, the first outer cover 401 is provided with a first socket 404 for accommodating the pins 403, the first socket 404 is provided with a partition 405 for separating the pins 403, the tip of the pins 403 is located inside the tip of the divider 405 with a safety distance therebetween.

The inside and outside are set from two sides to the middle with respect to the strip light frame 100, the inner side is relatively close to the middle, and the outer side is relatively close to both sides. The safety distance means that, after setting the partition 405, the first socket 404 is divided into a plurality of small areas, the number of the small areas is set according to the number of the pins 403, and these small areas can be enclosed or constricted. The purpose is to block the touch of fingers, combined with the setting of safety distance, so as to meet safety requirements and prevent the risk of accidental touch, which can be judged by a test finger. The small area formed by the partition 405 and the first socket 404 surrounds the vicinity of the pin 403 and jointly ensure that safety requirements are met.

The partition 405 can be provided separately, and can be arranged inside the first socket 404, or can extend out of the first socket 404. In this embodiment, the partition 405 and the first outer cover 401 is integrally formed. The above structure can simplify the components.

In this embodiment, the outer side of the partition 405 is flush with the outer side of the first outer cover 401. Further, the small area is configured as a hole structure, corresponding to each pin 403.

The number of pins 403 is set according to the function of the lamp, and can be 3 to 5 or more. For example, it is necessary to adjust the light. In this embodiment, there are three pins 403, which are respectively used to connect the positive pole, negative and ground.

The optical assembly 300 is used for secondary light distribution and packaging of the light source module 200. In this embodiment, the optical assembly 300 includes a strip lens 301, and the strip lens 301 is not Symmetrical settings in a plane perpendicular to the length direction. In this embodiment, the strip lens 301 is also used for packaging lamps. If the strip lens 301 cannot be used for packaging lamps, other optical components such as a lampshade may be additionally provided, and additional installations may be added as required.

In order to adapt to the structure of the male socket, in this embodiment, the female socket 502 is provided with jacks 503 corresponding to the number of the pins 403, and the jacks 503 are spaced apart from each other.

In this embodiment, the light source module 200 includes a strip-shaped circuit board 201 and LED chips 202 arranged on the strip-shaped circuit board 201 and arranged along the length direction. LED lighting can perform secondary light distribution to obtain asymmetric light output, which is suitable for this solution.

Figure 6:
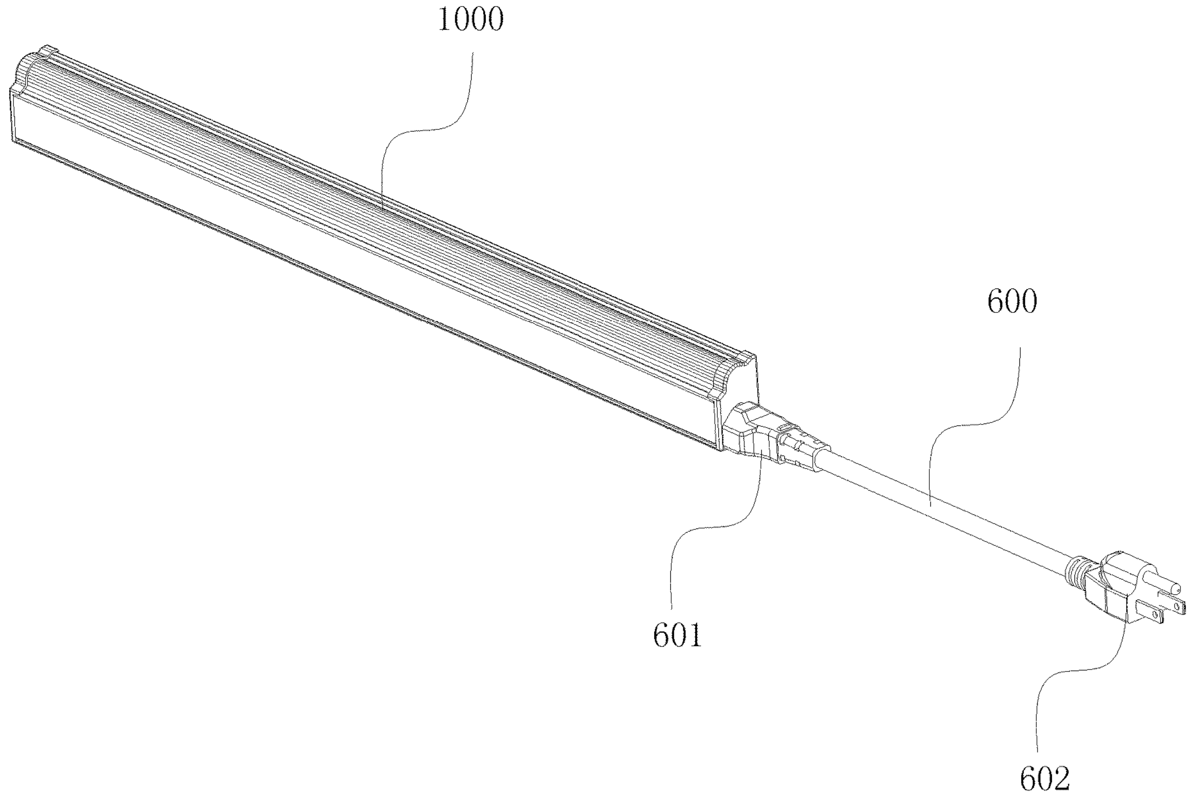
FIG. 6 is a schematic diagram of the structure of the strip light (first external wire being in connection state) of the embodiment.
Figure 7:
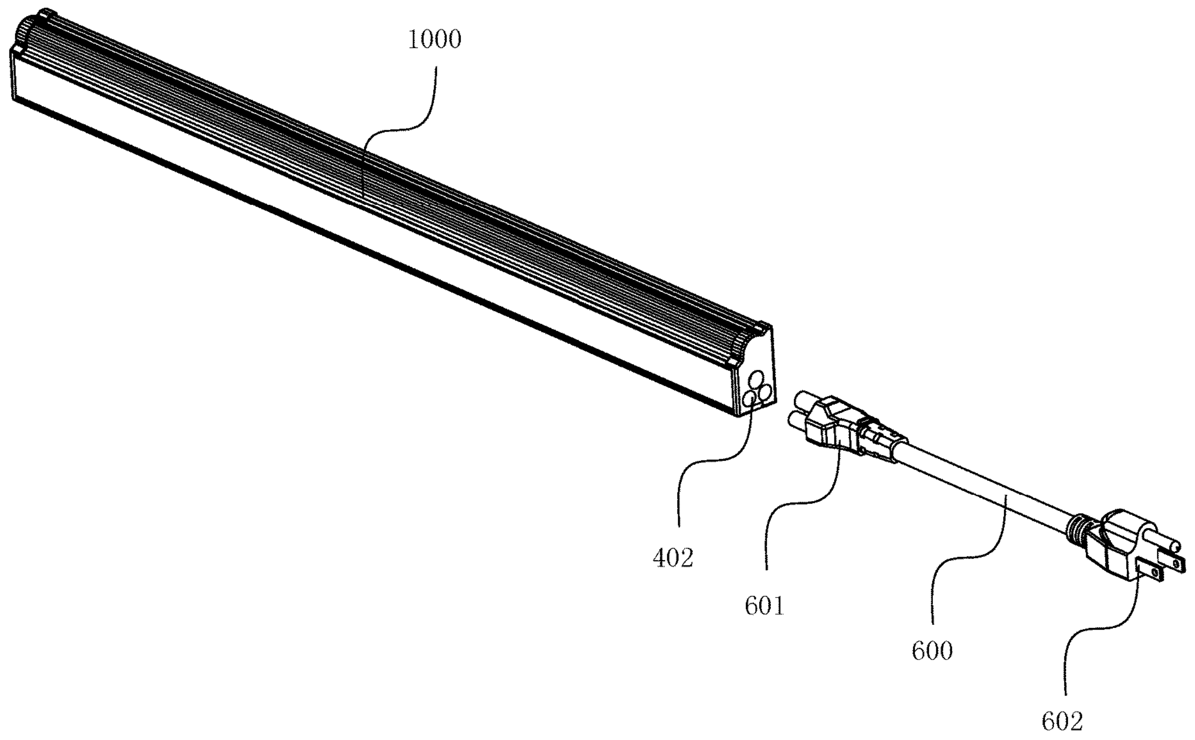
FIG. 7 is a schematic diagram of the structure of the strip light (the first external wire being to be connected) of the embodiment.

As shown in FIGS. 6 and 7, when the strip light 100 is used as an external basis and one end of the male socket 402 is connected to the commercial power supply, it also includes a first external lead 600, and one end of the first external lead 600 is provided with a female plug 601 that cooperates with the male socket 402, the other end is provided with a first mains plug 602.

Figure 8:
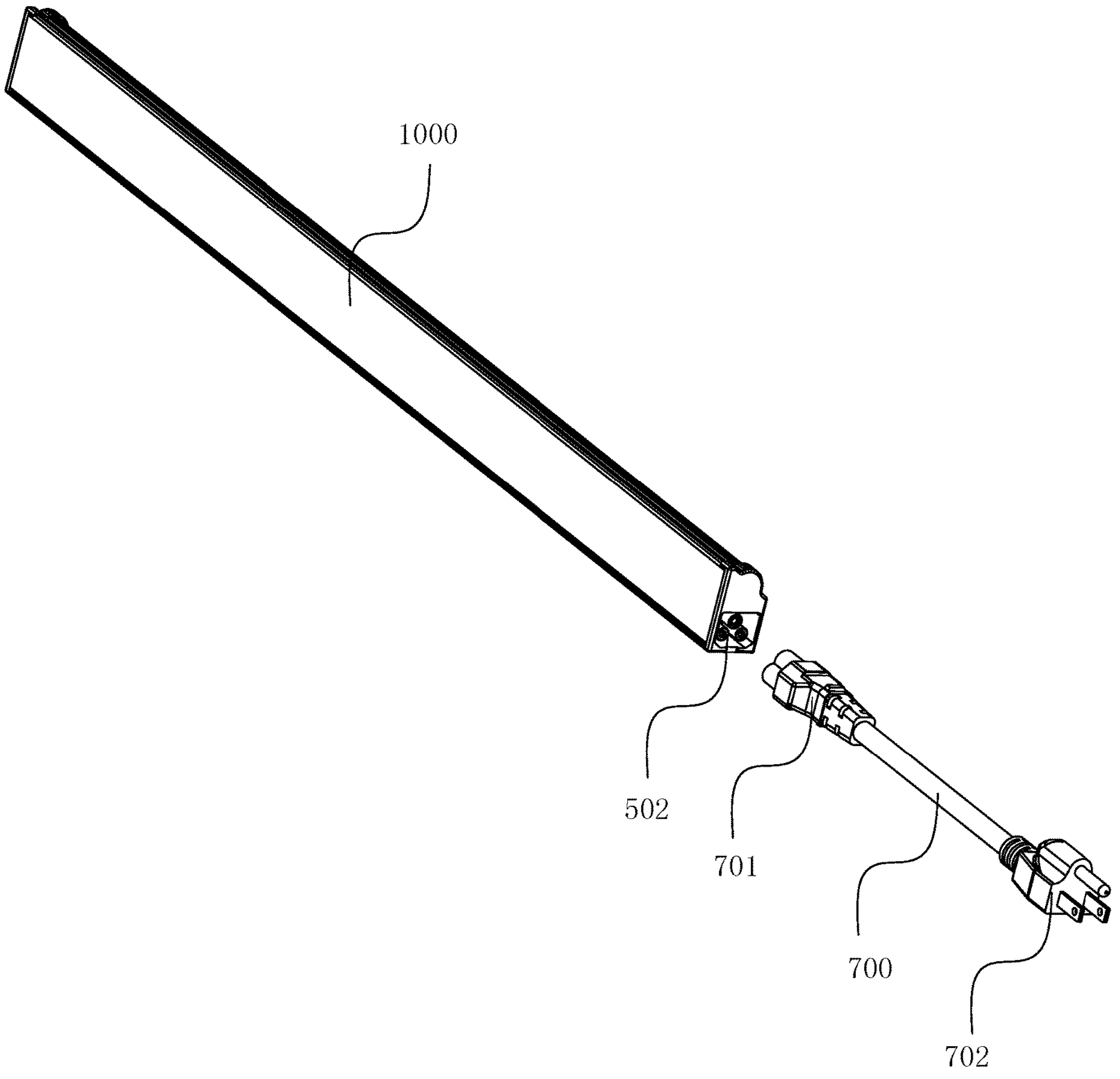
FIG. 8 is a schematic diagram of the structure of the strip light (second external wire being to be connected).

As shown in FIG. 8, when the strip light 100 is used as an external basis and one end of the female socket 502 is connected to the mains, it also includes a second external wire 700, and one end of the second external wire 700 is provided with a male plug 701 to match the female socket 502, the other end is provided with a second mains plug 702.

Figure 9:
FIG. 9 is a schematic diagram of the structure of the strip light set (in connection state by wire).
Figure 10:
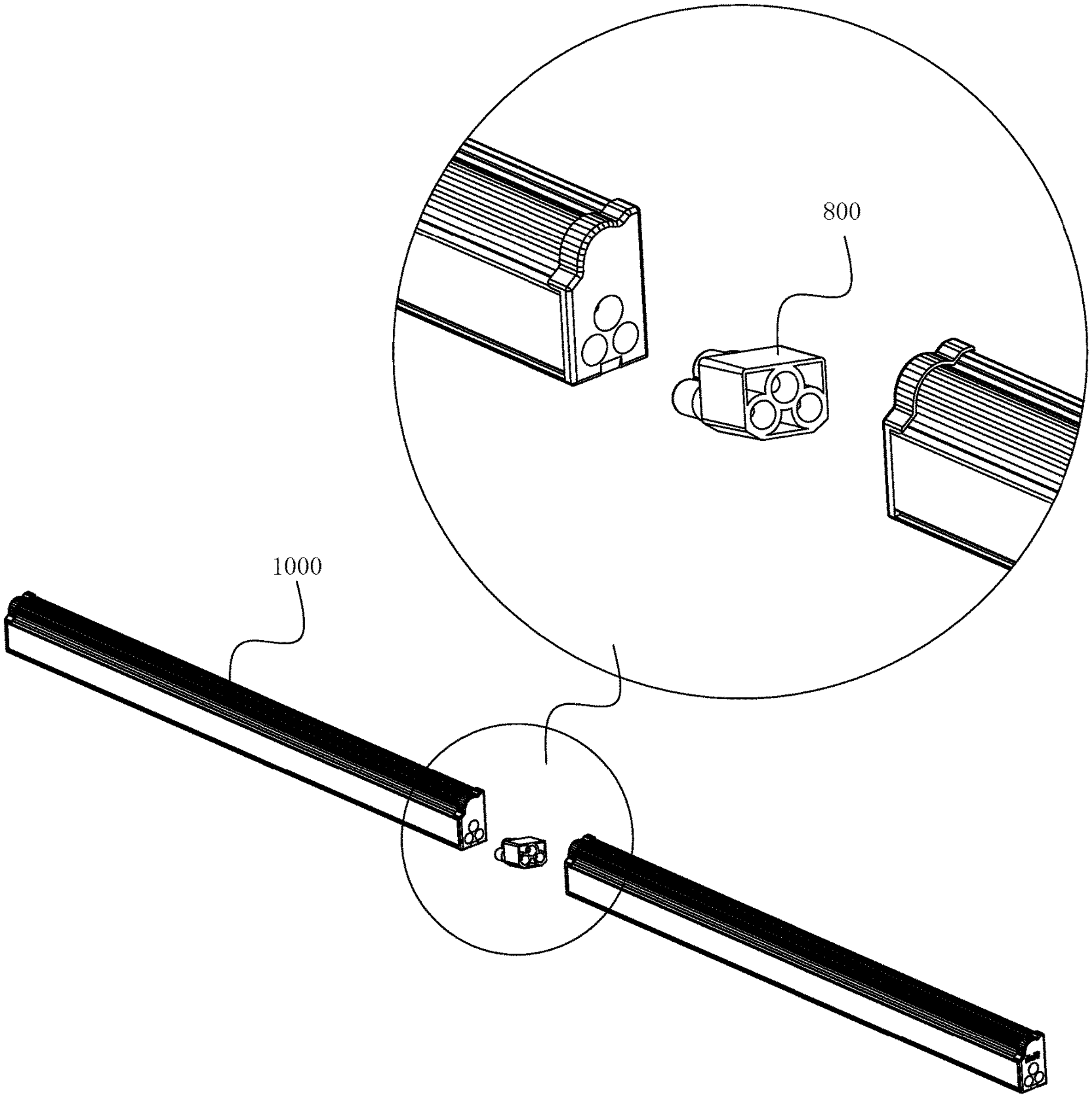
FIG. 10 is a schematic diagram of the structure of the strip light set (being to be connected by socket).
Figure 11:
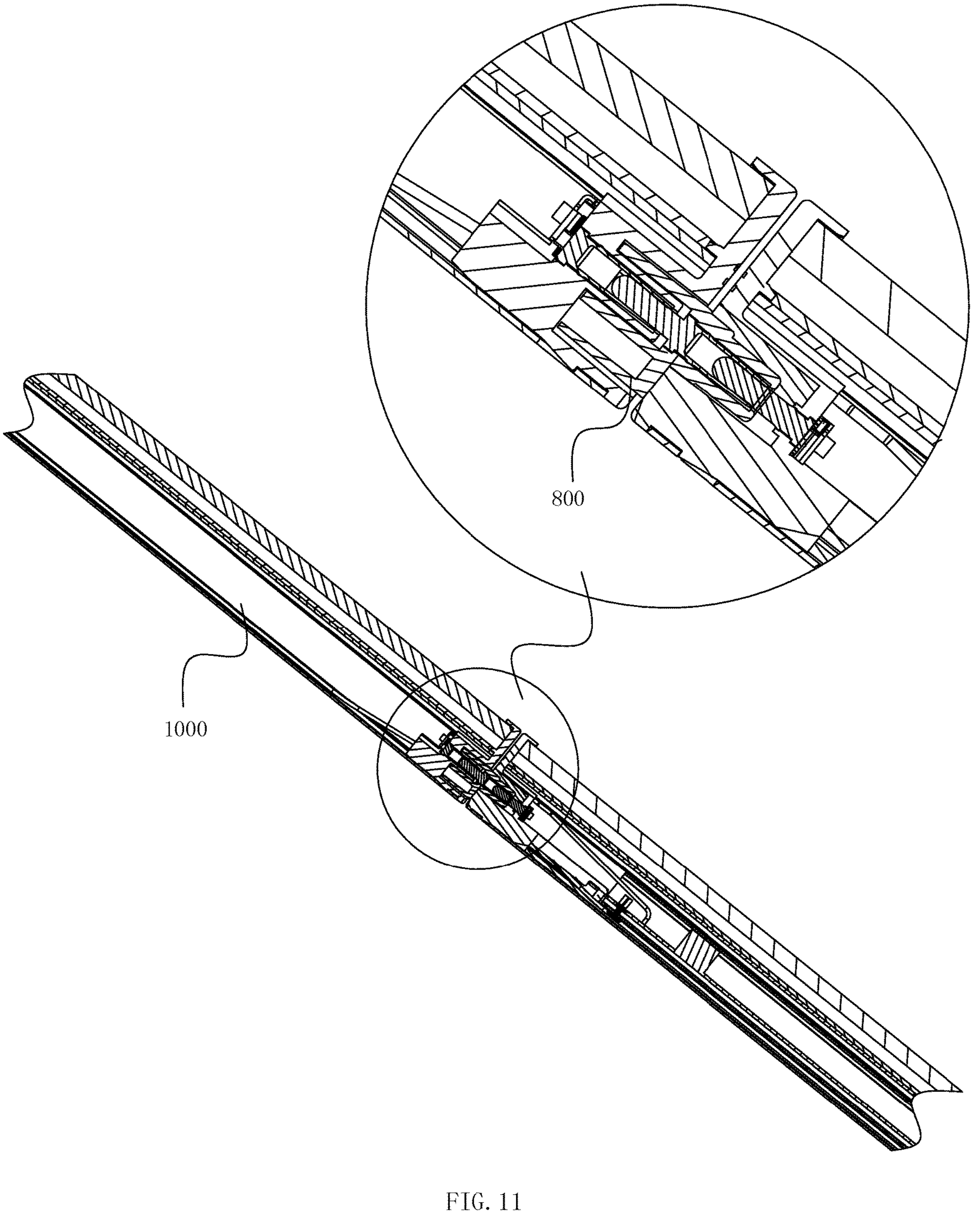
FIG. 11 is a schematic diagram of the structure of the strip light set (in connection state by socket) of the embodiment in partial section.

The strip light set in this embodiment includes at least two of the above-mentioned strip lights 1000 and an interconnection joint 800. One end of the interconnection joint 800 is connected to the male socket 402 of one strip light 1000, and the other end is connected to female socket 502 of another strip light 1000. The interconnection joint 800 may be in the form of a wire, such as shown in FIG. 9, it can also be in socket form, such as shown in FIGS. 10 and 11, the latter can realize interconnection without dark area, and the former is more flexible in installation.

The strip light in this embodiment meets the requirement of safety regulations that the same lamp cannot be of the same male and the same female, and at the same time realizes the function of feeding electricity at both ends. It means that the strip light can be applied in high-voltage put in. The LED chip 202 can perform secondary light distribution through the strip lens 301 according to the needs of different scenarios and set asymmetric light emitting effects as needed, such as unilateral sweep light irradiation effect, to meet the needs of diversified customers, and the safety distance setting meets the requirements of the test finger in the safety regulations, no risk of electric shock, more convenient to adapt to various room electricity wiring, no need to consider the arrangement of lamps.

The above are only preferred embodiments of the present invention, and are not intended to limit the protection scope of the present invention. Any modifications, equivalent replacements or improvements within the spirit of the present invention are covered by the present invention within the scope of the claims.

What is claimed is:

1. A strip light (1000), comprising
- a strip lamp holder (100),
- a light source module (200) arranged on the strip lamp holder (100),
- an optical assembly (300) arranged on the light source module (200) in the direction of the light source module (300), and
- a first end cover assembly (400) and a second end cover assembly (500) arranged on opposite ends of the strip lamp holder (100), the first end cover assembly (400) comprising
  - a first outer cover (401) fixed to a first end of the strip lamp holder (100) and a male socket (402) electrically connected with the light source module (200), the male socket (402) is provided with three pins (403), and the first outer cover (401) is provided with a first socket (404) for accommodating the pins (403),
  - characterized in that, the first socket (404) is provided with a first partition (405) that isolates the pins (403) within separate cylindrical spaces, ends of the pins (403) are located inside the cylindrical spaces and a safe distance is provided between them, the three pins respectively connecting to a positive electrode, a negative electrode, and a ground; and
- the second end cover assembly (500) comprising
  - a second outer cover (501) fixed to a second end of the strip lamp holder (100) and a female socket (502) electrically connected with the light source module (200).

2. The strip light (1000) as claimed in claim 1, wherein the first partition (405) is integrally formed with the first outer cover (401).

3. The strip light (1000) as claimed in claim 2, wherein the outer side of the first partition (405) is flush with the outer side of the first outer cover (401).

4. The strip light (1000) as claimed in claim 1, wherein the optical assembly (300) includes a strip lens (301), and the strip lens (301) is asymmetrically arranged in a plane perpendicular to the length direction.

5. The strip light (1000) as claimed in claim 1, wherein the female socket (502) is provided with jacks (503) corresponding to the number of pins (403), and the jacks (503) are isolated from each other within separate cylindrical spaces by a second partition.

6. The strip light (1000) as claimed in claim 1, wherein the light source module (200) comprises a strip-shaped circuit board (201) and LED chips (202) arranged on the strip-shaped circuit board (201) along the lengthwise direction.

7. The strip light (1000) as claimed in claim 1, further comprising a first external wire (600), a first end of the first external wire (600) is provided with a female plug (601) that is electrically connected to the male socket (402), and a second end is provided with a first mains plug (602).

8. The strip light (1000) as claimed in claim 1, further comprising a second external wire (700), a first end of the second external wire (700) is provided with a male plug (701) that is electrically connected to the female socket (502), and a second end is provided with a second mains plug (702).

9. A strip light set, comprising at least two strip lights (1000) according to claim 1 and an interconnection joint (800), wherein a first end of the interconnection joint (800) is connected to one male socket (402) of the high-voltage strip light (1000), the second end is connected to the female socket (502) of another strip light (1000).

* * * * *